(12) United States Patent
Noelle et al.

(10) Patent No.: US 7,568,339 B2
(45) Date of Patent: Aug. 4, 2009

(54) CONTROL FOR VARIABLE GEOMETRY COMPRESSOR

(75) Inventors: Phillipe Noelle, Vincey (FR); Nicolas Vazeille, Nancy (FR)

(73) Assignee: Honeywell International, Inc., Morristown, NJ (US)

( * ) Notice: Subject to any disclaimer, the term of this patent is extended or adjusted under 35 U.S.C. 154(b) by 130 days.

(21) Appl. No.: 11/376,379

(22) Filed: Mar. 14, 2006

(65) Prior Publication Data

US 2007/0214787 A1 Sep. 20, 2007

(51) Int. Cl.
F02B 33/44 (2006.01)
F02B 37/24 (2006.01)
G06F 19/00 (2006.01)

(52) U.S. Cl. ................. 60/605.1; 701/102; 701/110
(58) Field of Classification Search ........... 60/600–603, 60/605.1, 611, 9.273, 39.27; 415/118, 164; 701/100, 102, 106, 108, 110
See application file for complete search history.

(56) References Cited

U.S. PATENT DOCUMENTS

| | | | | |
|---|---|---|---|---|
| 3,795,104 A | * | 3/1974 | McLean | .................... 60/39.27 |
| 3,981,140 A | * | 9/1976 | Lunsford et al. | ............ 415/164 |
| 4,428,199 A | | 1/1984 | Moore et al. | .................. 60/600 |
| 4,483,147 A | * | 11/1984 | Evans et al. | ................... 60/611 |
| 4,947,643 A | * | 8/1990 | Pollak et al. | ................ 60/39.27 |
| 6,256,993 B1 | * | 7/2001 | Halimi et al. | .................. 60/600 |
| 7,073,334 B2 | * | 7/2006 | Sumser et al. | ................. 60/602 |
| 7,111,461 B2 | * | 9/2006 | Richey | ........................ 60/602 |
| 7,165,399 B2 | * | 1/2007 | Stewart | ....................... 60/600 |
| 7,165,538 B2 | * | 1/2007 | Kassner | ....................... 123/564 |
| 7,237,381 B2 | * | 7/2007 | Kolavennu et al. | ............. 60/602 |
| 7,328,577 B2 | * | 2/2008 | Stewart et al. | ................. 60/602 |
| 2005/0265822 A1 | * | 12/2005 | Fledersbacher et al. | ...... 415/118 |
| 2008/0053091 A1 | * | 3/2008 | Barthelet | ...................... 60/608 |

FOREIGN PATENT DOCUMENTS

| EP | 1772608 | | 4/2007 |
|---|---|---|---|
| WO | WO 2004038229 A1 | * | 5/2004 |
| WO | 2006115596 | | 11/2006 |

OTHER PUBLICATIONS

PCT ISR/WO PCTUS07/063533.

* cited by examiner

*Primary Examiner*—Thai-Ba Trieu
(74) *Attorney, Agent, or Firm*—Brian Pangrle (57) ABSTRACT

An exemplary controller for a variable geometry compressor includes one or more inputs for receiving engine operating information and for receiving a signal representative of geometry of a variable geometry compressor and control logic to call for actuation of an actuator based at least in part on the engine operating information received by the one or more inputs and to call for actuation of the actuator based at least in part on the signal received by the one or more inputs whereby actuation of actuator causes a change in geometry of a variable geometry compressor. Various other exemplary technologies are also disclosed.

8 Claims, 6 Drawing Sheets

CONTROL FOR VARIABLE GEOMETRY COMPRESSOR

TECHNICAL FIELD

Subject matter disclosed herein relates generally to control of variable geometry compressors, for example, variable geometry compressors for use with internal combustion engines.

BACKGROUND

Variable geometry compressors are finding increasing use for enhancing performance of internal combustion engines. Such compressors are typically driven via an exhaust turbine, which may be a fixed geometry exhaust turbine or a variable geometry exhaust turbine. Variable geometry compressors help to enhance engine performance by providing an ability to change an otherwise fixed diffuser geometry. For example, diffuser geometry may be changed to adapt the compressor map to the engine running conditions.

However, control strategies for variable geometry compressors are lacking. Only simple control strategies have been used such as changing the geometry in "steps" to avoid surge and choke, where the steps were manually determined and set according to trials performed by an engine test bed technician. Typical trials involved changing ERPM and engine load until met by surge or choke (or a target point) followed by updating the compressor geometry to maximize the compressor efficiency. Then, the technician would manually determine a set of steps. The variable geometry compressor would then use these steps during operation, mainly in an effort to avoid surge and choke.

Consequently, a need exists for better control strategies for variable geometry compressors. Various exemplary technologies disclosed herein aim to meet this need and/or other needs.

SUMMARY

An exemplary controller for a variable geometry compressor includes one or more inputs for receiving engine operating information and for receiving a signal representative of geometry of a variable geometry compressor and control logic to call for actuation of an actuator based at least in part on the engine operating information received by the one or more inputs and to call for actuation of the actuator based at least in part on the signal received by the one or more inputs whereby actuation of actuator causes a change in geometry of a variable geometry compressor. Various other exemplary technologies are also disclosed.

BRIEF DESCRIPTION OF THE DRAWINGS

A more complete understanding of the various method, systems and/or arrangements described herein, and equivalents thereof, may be had by reference to the following detailed description when taken in conjunction with the accompanying drawings wherein.

DETAILED DESCRIPTION

Turning to the drawings, various methods are illustrated as being optionally implemented in a suitable control and/or computing environment, for example, in the general context of computer-executable instructions, such as program modules, being executed by a computer and/or other computing device. Generally, program modules include instructions, routines, programs, objects, components, data structures, etc. One or more computer-readable media may be used to store such information.

In some diagrams herein, various algorithmic acts are summarized in individual "blocks". Such blocks describe specific actions or decisions that are made or carried out as a process proceeds. Where a controller (or equivalent) is employed, the flow charts presented herein provide a basis for a "control program" or software/firmware that may be used by such a controller (or equivalent) to control a device and/or a system. As such, various processes may be implemented as machine-readable instructions storable in memory that, when executed by a processor, perform various acts illustrated as blocks. In addition, various diagrams include individual "blocks" that are optionally structural elements of a device and/or a system. For example, a "controller block" optionally includes a controller as a structural element, a "sensor block" optionally includes a sensor as a structural element, a "turbocharger block" optionally includes a turbocharger as a structural element, etc.

Those skilled in the art may readily write such a control program based on the flow charts and other descriptions presented herein. It is to be understood and appreciated that the subject matter described herein includes not only devices and/or systems when programmed to perform the acts described below, but the software that is configured to program the controllers and, additionally, any and all computer-readable media on which such software might be embodied. Examples of such computer-readable media include, without limitation, floppy disks, hard disks, CDs, RAM, ROM, flash memory and the like.

Figure 1:
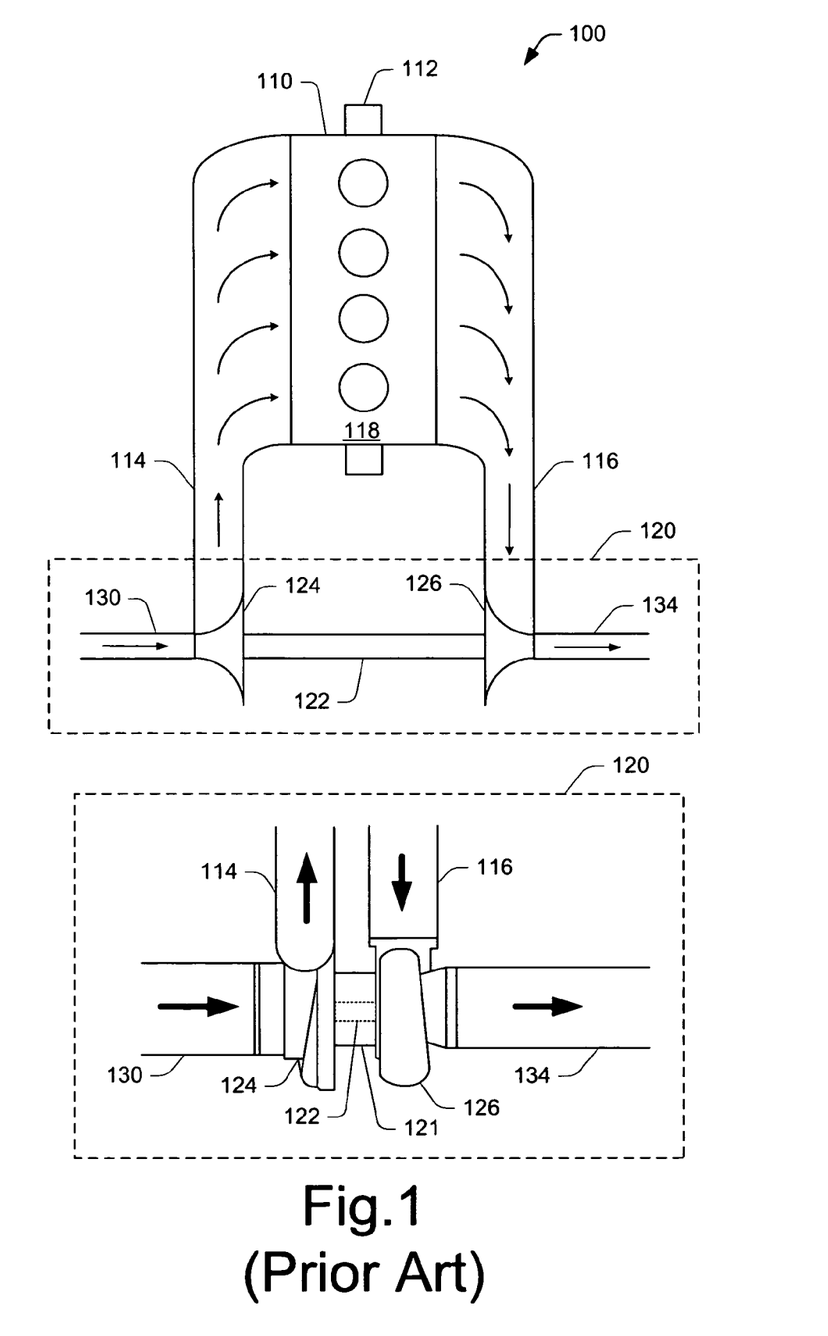
FIG. 1 is a simplified approximate diagram illustrating a prior art turbocharger system for an internal combustion engine.

Turbochargers are frequently utilized to increase the power output of an internal combustion engine. Referring to FIG. 1, a prior art power system 100 includes an internal combustion engine 110 and a turbocharger 120. The internal combustion engine 110 includes an engine block 118 housing one or more combustion chambers that operatively drive a shaft 112. An intake port 114 provides a flow path for compressed intake air to the engine block while an exhaust port 116 provides a flow path for exhaust from the engine block 118. The turbocharger 120 acts to extract energy from the exhaust and to provide energy to the intake air.

As shown in FIG. 1, the turbocharger 120 includes an air inlet 130, a shaft 122, a compressor stage 124, a turbine stage 126 and an exhaust outlet 134. Such a turbocharger may include one or more variable geometry units, which may use multiple adjustable vanes, an adjustable diffuser section, a wastegate or other features to control the flow of exhaust (e.g., Variable geometry turbine) or to control the flow of intake air (e.g., variable geometry compressor).

In general, the turbine stage 126 includes a turbine wheel housed in a turbine housing and the compressor stage 124 includes a compressor wheel (see, e.g., wheel 202 of FIG. 2) housed in a compressor housing (see, e.g., compressor housing 204 of FIG. 2) where the turbine housing and compressor housing connect directly or indirectly to a center housing 121. The center housing 121 typically houses one or more bearings that rotatably support the shaft 122, which is optionally a multi-component shaft.

Figure 2:
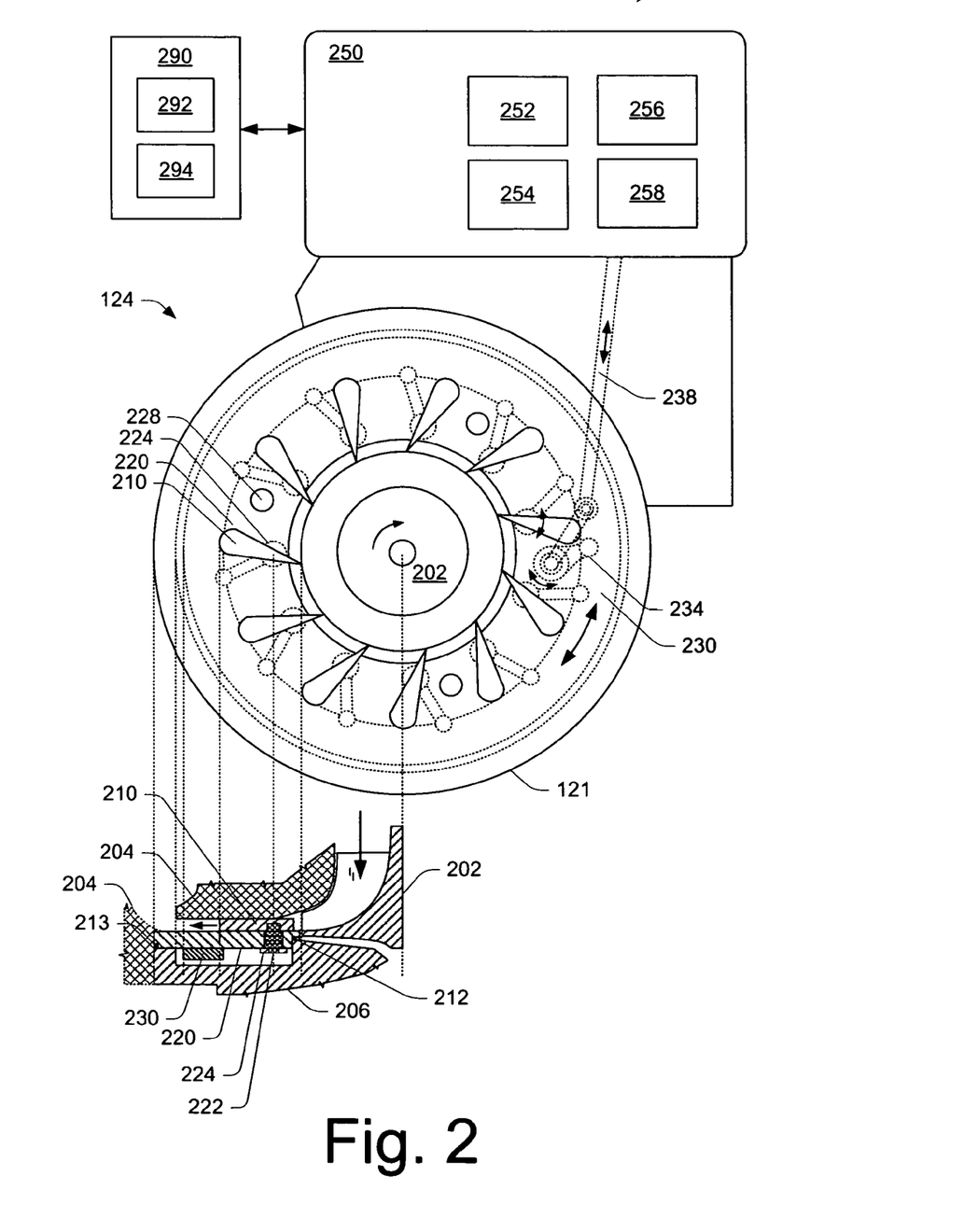
FIG. 2 is diagram of an assembly of a variable geometry compressor suitable for use with the internal combustion engine of FIG. 1.

FIG. 2 shows a top view of an assembly 200 that includes various compressor stage 124 components, a center housing 121, a variable geometry controller 250 and an engine control unit 290. A cross-sectional view of various components is also shown.

In this example of a variable geometry compressor, a plurality of vanes 210 alter geometry of a diffuser section, which is defined by the compressor housing 204 and an annular nozzle ring 220. The annular arrangement of vanes 210, the compressor housing 204 and the annular nozzle ring 220 define a plurality of nozzles for passage of air from the compressor wheel 202 to a volute defined at least in part by the compressor housing 204. While this example includes eleven vanes, other examples may include a different number of vanes, or as already mentioned, use a different mechanism to vary diffuser section geometry.

Each vane 210 is supported on a shaft 222, which forms a rotational axis for that vane. The shaft 222 is fixedly joined to and extends from the vane 210. The longitudinal direction of a vane's rotational axis extends between a substantially planer diffuser surface of the housing 204 and the annular nozzle ring 220. Thus, the vanes 210 are pivotable about their respective rotational axes, the shafts 222 pivoting with respect to their vanes, and the axes of rotation being generally parallel to the axis of rotation of the compressor wheel 202.

The vanes 210 are shown as having an elongated teardrop or wedge shape. The tips of the vanes 210 are directed upstream, against the flow of air in the diffuser section. The broader, rounded butt of each vane 210 is downstream and the shaft 222 disposed between the tip end and butt end. The specifics of vanes 222 are for example only as vanes having other suitable shapes may be used.

Each vane 210 is connected by its shaft 222 to a vane arm 224. The connection of the shaft 222 to its vane arm 224 is fixed (e.g., welded, etc.) so that the vane 210, its shaft 222, its vane arm 224 move together as a unit. Each vane arm 224 includes an enlarged inner end defining an eye for receiving the shaft 222 whereby the arm 224 is connected to a medial portion of the vane 210. Each vane arm 224 includes a vane arm shaft that connects the inner end of the vane arm to its round outer end knob.

A unison ring 230 includes a plurality of sockets where each socket receives an outer end knob of a vane arm 224. The sockets allow for some movement (e.g., rotation) of the outer end knobs but also secure the outer end knobs to some extent.

With respect to cooperation between various components of the assembly 200, in this example, the nozzle ring 220 mounts between the compressor housing 204 and the center housing 121 or a component 206 of the center housing 121, which may be a back plate. O-rings or other sealing components 212, 213 may be used to form seals between the nozzle ring 220 and other components (e.g., the compressor housing 204 and the back plate 206).

Adjustment of the vanes 210 occurs upon rotation of the unison ring 230 about its axis, typically coincident with the rotational axis of the compressor wheel 202. More specifically, rotation of the unison ring 230, with the vane arms 224 pivotally attached thereto by their movable engagement in the sockets, permits the rotational position of the vanes 210 to be adjusted. By adjusting the rotational position of the vanes 210, the passage area in the diffuser section is regulated. For example, the passage area decreases by moving the vanes 210 in a direction for aligning the vanes 220 with the tangential direction with respect to the compressor wheel 202; whereas, the passage area increases by moving the vanes 210 in a direction for aligning the vanes 210 with the radial direction of the compressor wheel 202. By a movement of the vanes 210, flow is altered (e.g., pressure, velocity, flow rate). Alteration of flow, in turn, can affect turbocharger performance and hence engine performance. Thus, vanes 210 can be adjusted to optimize engine performance.

With respect to control of a variable geometry compressor, in the example of FIG. 2, the vanes 210 are controlled by a crank mechanism operably connected to the unison ring 230. The crank mechanism includes an attachment mechanism 234 to attach the crank mechanism to the unison ring 230 and a control arm 238. The control arm 238 translates to cause movement of the attachment mechanism 234 and in turn rotation of the unison ring 230 and vanes 210.

The controller 250 for controlling the variable geometry compressor components of FIG. 2 includes a processor 252 and memory 254 where the memory 254 stores information for use in control, to enable control, to enhance diagnostics (e.g., black box), etc. In the example of FIG. 2, the controller 250 includes an actuator (e.g., a vacuum actuator, electronic actuator, a hydraulic actuator, etc.) to move the control arm 238 where movement of the control arm 238 causes the geometry of the diffuser section to vary (e.g., by movement of the vanes 210). The controller 250 optionally includes a position sensor 256 to facilitate control or to ascertain vane position. For example, where vane position is not readily inferred from the actuator, then a position sensor may be used to sense position of a control component (e.g., control arm 238, unison ring 230, vane 210, etc.) to thereby determine vane position.

The controller 250 is in communication with an engine control unit (ECU) 290 that includes a processor 292 and memory 294. The ECU 290 may provide the controller 250 with any of a variety of information (e.g., instructions, throttle, engine speed, etc.) and the controller 250 may likewise provide the ECU 290 with information (e.g., compressor efficiency, vane position, etc.). The controller 250 may be programmed by the ECU 290 or by other techniques. The memory 254 of the controller may store information received via an interface (wired or wireless) or it may be removed and replaced with a re-programmed memory or a different memory. Such information may include instructions executable by the processor 252 to effectuate control or other tasks. A processor is optionally provided having pre-programmed instructions. The processor 252 and memory 254 are optionally provided as a single integrated circuit (e.g., a chip) or as more than one integrated circuit (e.g., a chipset).

As described herein, an exemplary control scheme uses a map, data and/or a model to control geometry of a variable geometry compressor. In general, this control scheme aims to vary diffuser geometry to adapt the compressor map to engine operating conditions.

While a particular example uses a second order model or algorithm, other models may be used. A model may be used to create a map, data (e.g., look-up table, etc.) and/or programmed into the memory 254 as computer-readable instructions for execution by the processor 252. While the controller 250 may be a digital controller, an analog controller or analog circuitry may be used to implement a model. Of course, some models may be more readily implemented using a digital controller.

Figure 4:
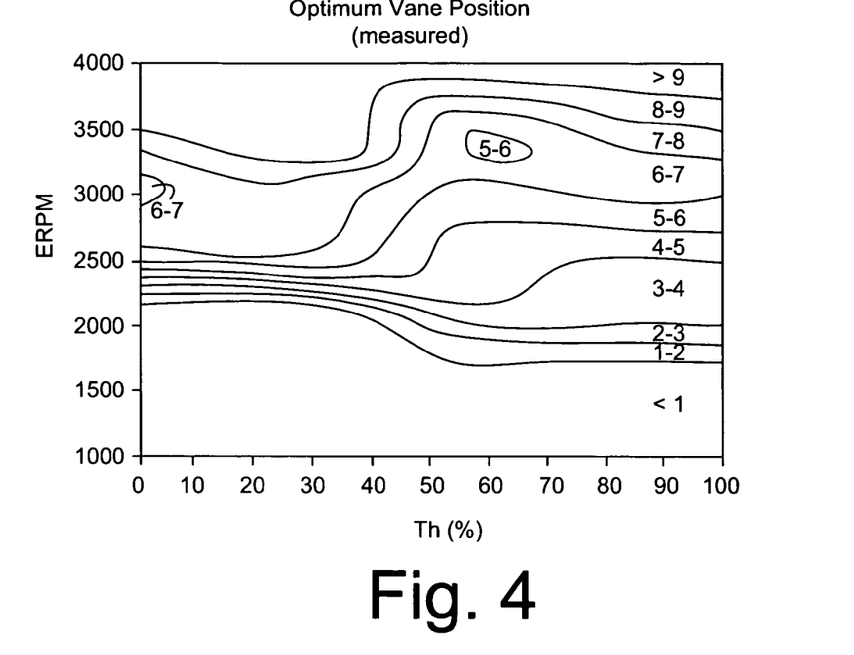
FIG. 4 is a contour plot of vane positions versus engine RPM and engine throttle.
Figure 5:
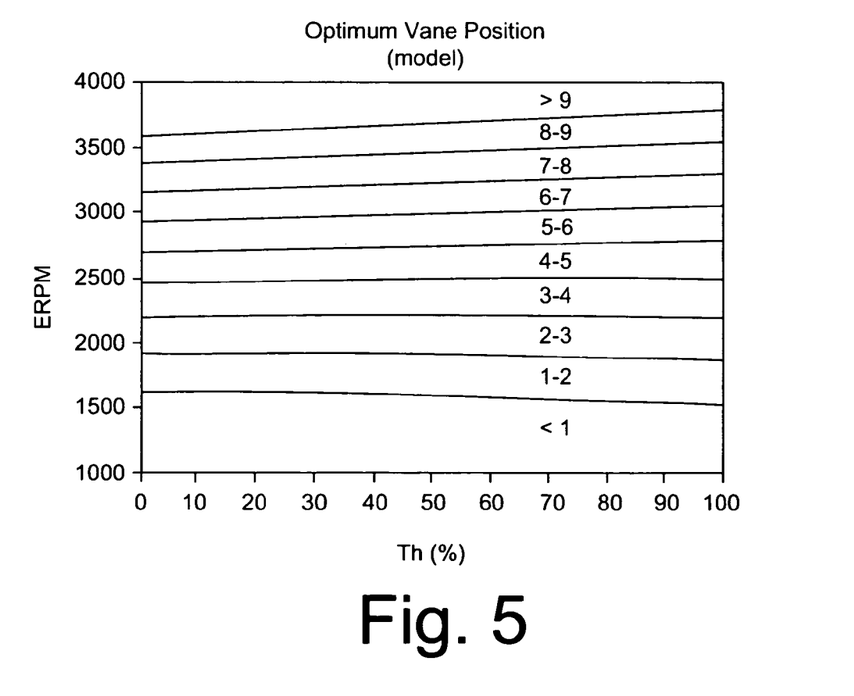
FIG. 5 is a contour plot of model-based vane positions versus engine RPM and engine throttle that corresponds to the data of the plot of FIG. 4.

Data presented in FIGS. 4 and 5 pertain to the following second order model:

$$VP = A + B*ERPM + C*Th + D*ERPM*Th + E*ERPM^2 + F*Th^2,$$

where VP is vane position (geometry), ERPM is engine RPM and Th is throttle position of the engine in percent. This model includes coefficients A, B, C, D, E and F. These coefficients may be determined in any of a variety of manners. Other models may have a different number of coefficients, for example, a linear model (e.g., VP=A+B*ERPM+C*Th) may have three coefficients.

Figure 3:
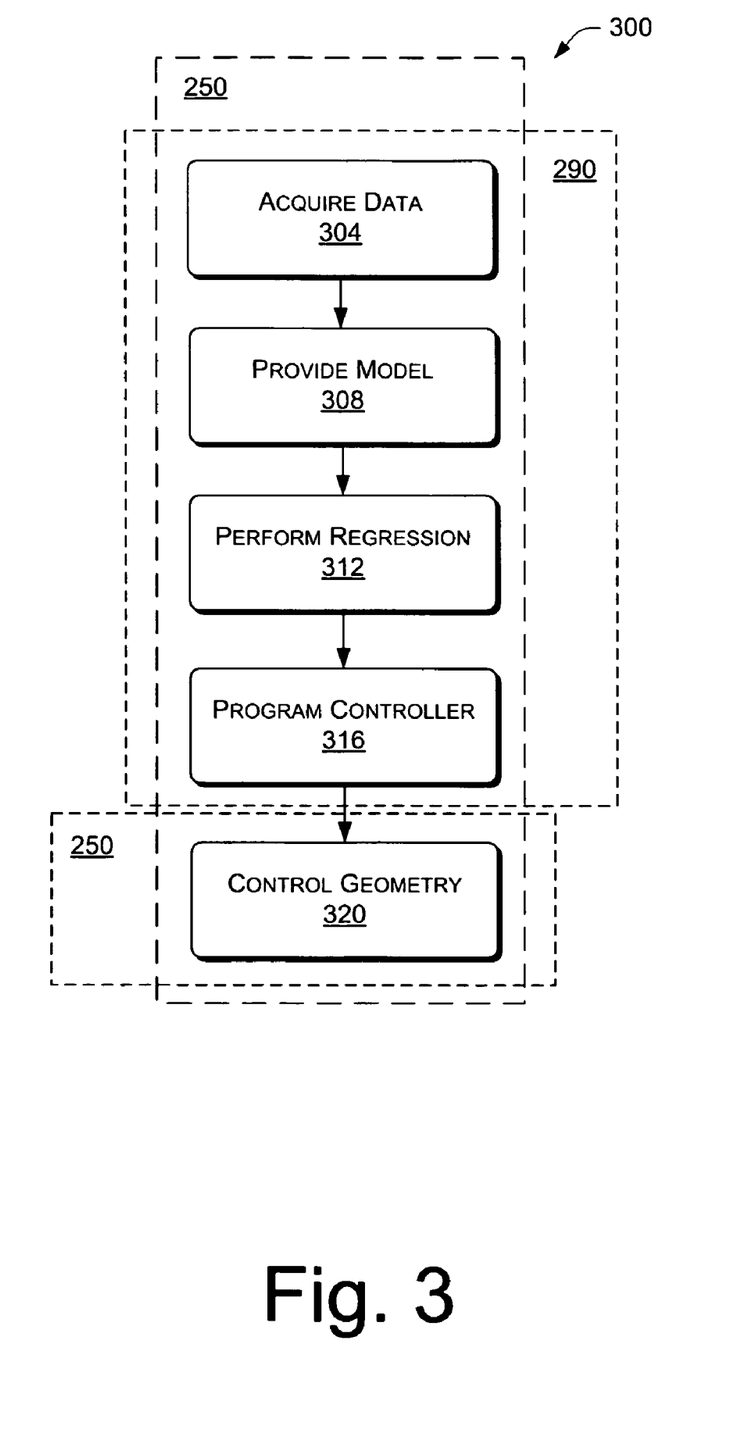
FIG. 3 is a diagram of an exemplary method for programming a controller for control of a variable geometry compressor.

An exemplary method 300 uses regression, which is a technique for fitting a curve (not necessarily a straight line) through a set of points using some goodness-of-fit criterion. While the most common type of regression is linear regression, regression algorithms for non-linear models exist (e.g., second order, logarithmic, etc.). Thus, given the five coefficient non-linear model and a set of points (data), the method 300 may use regression to determine values for the five coefficients. Where one or more of the coefficients adds little to the overall accuracy of the model (e.g., +/−5%), then that coefficient may be set to zero to eliminate the contribution. The method 300 is also shown in conjunction with the engine control unit 290 and the controller 250, which may be used for implementation of the method 300.

The method 300 commences with a data acquisition block 304 where the optimum vane position is determined with respect to compressor efficiency. For each engine load (throttle) and engine speed combination, vane position is changed until the compressor efficiency is maximized. For example, the acquisition block 304 may start at an engine speed of about 1000 (ERPM) with a fully closed vane position (VP) and full engine load (100% throttle). These parameters are varied and data acquired while avoiding compressor surge and compressor choke.

Once the data has been acquired, a provision block 308 provides a model, for example, the aforementioned five coefficient non-linear model. A regression block 312 then performs a regression analysis to determine values for the coefficients of the model, i.e., to fit the model to the data.

The method 300 continues in a program block 316 where a controller is programmed with the results of the regression (e.g., the values of the coefficients). A control block 320 then controls geometry of a variable geometry compressor, for example, as described with respect to FIG. 2.

Per the control block 320, a digital controller may implement the model using any particular increment for controlling geometry. In general, the method 300 allows for use of increments that are finer than the aforementioned "steps" (see Background). Thus, such a model-based approach may more readily match geometry with operational conditions when compared to a conventional, manually determined step approach.

The method 300 may be implemented using the controller 250 or the controller 250 and the engine control unit 290. For example, the controller 250 may include an algorithm that calls for performing engine operation trials to thereby acquire data (e.g., per acquisition block 304). In such an example, the controller 250 may include a parameter set (e.g., engine RPM, throttle position, etc.) and the ECU 290 may include a mechanism to run the engine through the parameter set and then via hardware and/or software aid the controller 250 in determining compressor efficiency for various vane positions.

The controller 250 may provide a single model (e.g., per the provision block 308) or it may provide more than one model for a regression analysis. Where more than one model is provided, selection of a model for use in control may occur based on an error analysis (e.g., best-fit to data). The controller 250 may then "program" itself to implement the model using coefficient(s) determined via the regression.

Further, one model may fit a particular set of operational conditions better than another set of operational conditions for the same engine. For example, the same engine may be suitable for marine use and for road use. Where these uses correspond to two different sets of operational conditions, one model may fit better marine operational conditions while another model may fit better road operational conditions. Thus, the method 300 allows for matching models and operational conditions.

With respect to a combination of the ECU 290 and the controller 250, various tasks (e.g., blocks 304-316) may be performed by the ECU 290 and control (e.g., block 320) by the controller 250. In such an example, the controller 250 generally receives information from the ECU 290 or directly from other components to control geometry of a variable geometry compressor.

The blocks 304-312 may occur on a separate computing system or on a computing system on network that includes the ECU 290 or the controller 250. Programming of the controller 316 optionally occurs using such a separate computer system or networked computer system.

A trial was performed using a separate computer system and MINITAB statistical analysis software (Minitab, Inc., State College, Pa., USA). Data was entered in a spreadsheet of the statistical analysis software. The data included various combinations of engine RPM and throttle position where each combination was associated with a vane position obtained for optimum compressor efficiency, i.e., an optimum vane position. These data are plotted in FIG. 4 as engine RPM (ERPM) versus throttle position (Th) where contours (e.g., splines fit to the data points) represent the optimum vane position (VP). In this trial, ERPM was varied from 1000 to 4000 and Th varied from about 0% full throttle to full throttle (100%). In this region of operation, the optimum vane positions ranges from less than 1 to greater than 9.

A regression was performed using the statistical analysis software and data. The regression provided values for the aforementioned coefficients A, B, C, D and E of the second order, non-linear model. The results of the regression are plotted in FIG. 5, again, as engine RPM (ERPM) versus throttle position (Th). While some differences exist between the plot of FIG. 4 and the plot of FIG. 5, the second order, five coefficient model adequately reflects the actual operational trends. Hence, the second order mode can serve as an adequate model for control of vane position of a variable geometry compressor.

Figure 6:
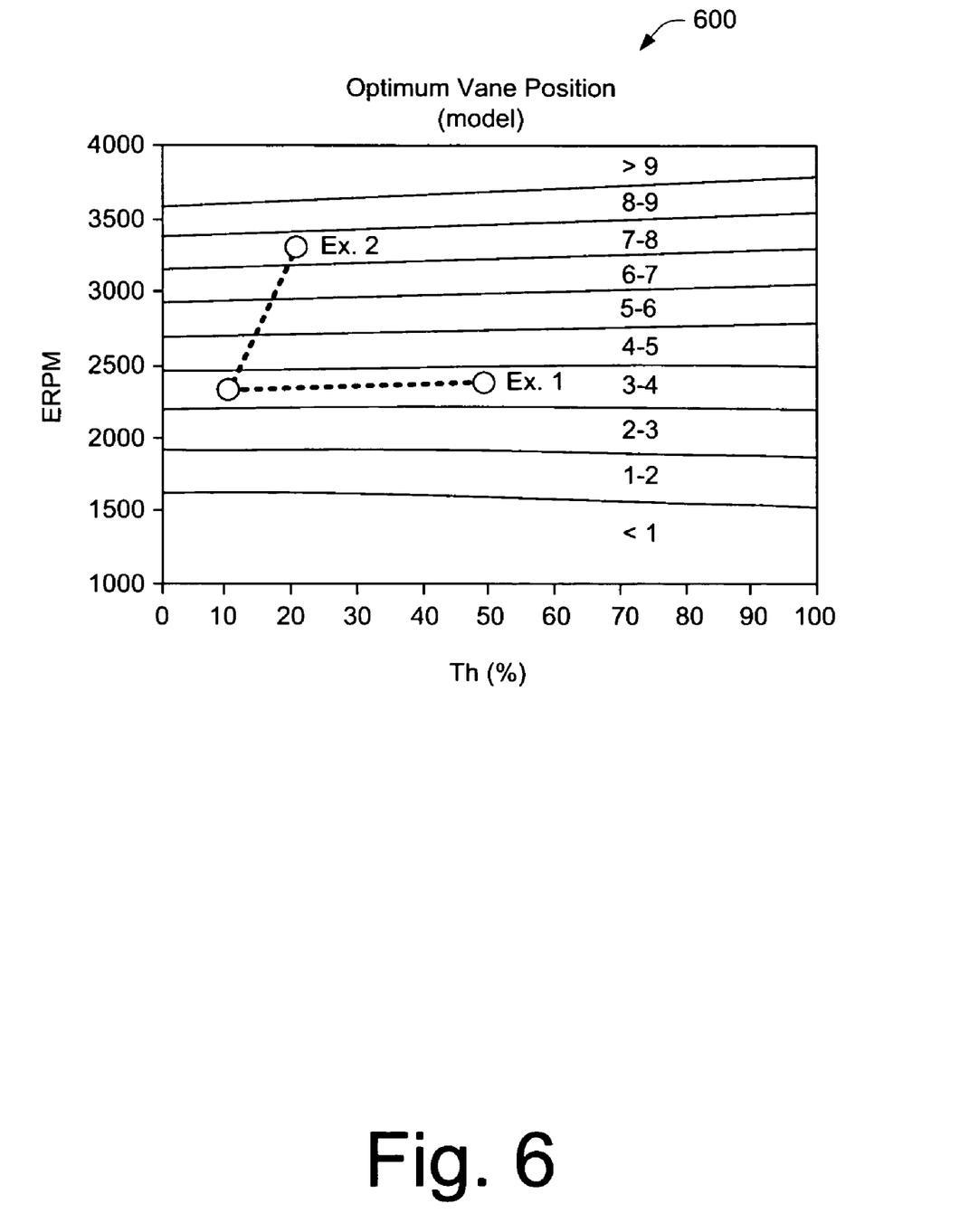
FIG. 6 is a contour plot of model-based vane positions versus engine RPM and engine throttle that shows two possible paths.

FIG. 6 shows two examples for changes in engine operating conditions (ERPM and Th) and corresponding control using the five coefficient non-linear model per the plot of FIG. 5. In a first example (Ex. 1), throttle increases/decreases from about 10% to about 50% and ERPM remains relatively constant at about 2400 RPM. In this example, the vane position remains relatively constant.

In a second example (Ex. 2), throttle increases/decreases from about 10% to about 20% and ERPM increases/decreases from about 2400 RPM to about 3400 RPM. In this example, the vane position changes from a range of about 3 to 4 to a range of about 7 to 8. A variable geometry controller may optionally operate in conjunction with an ECU to minimize vane changes, where applicable or desired. Information as to optimum vane position for operational conditions may be used in conjunction with engine use and aid in scheduling maintenance, etc.

Figure 7:
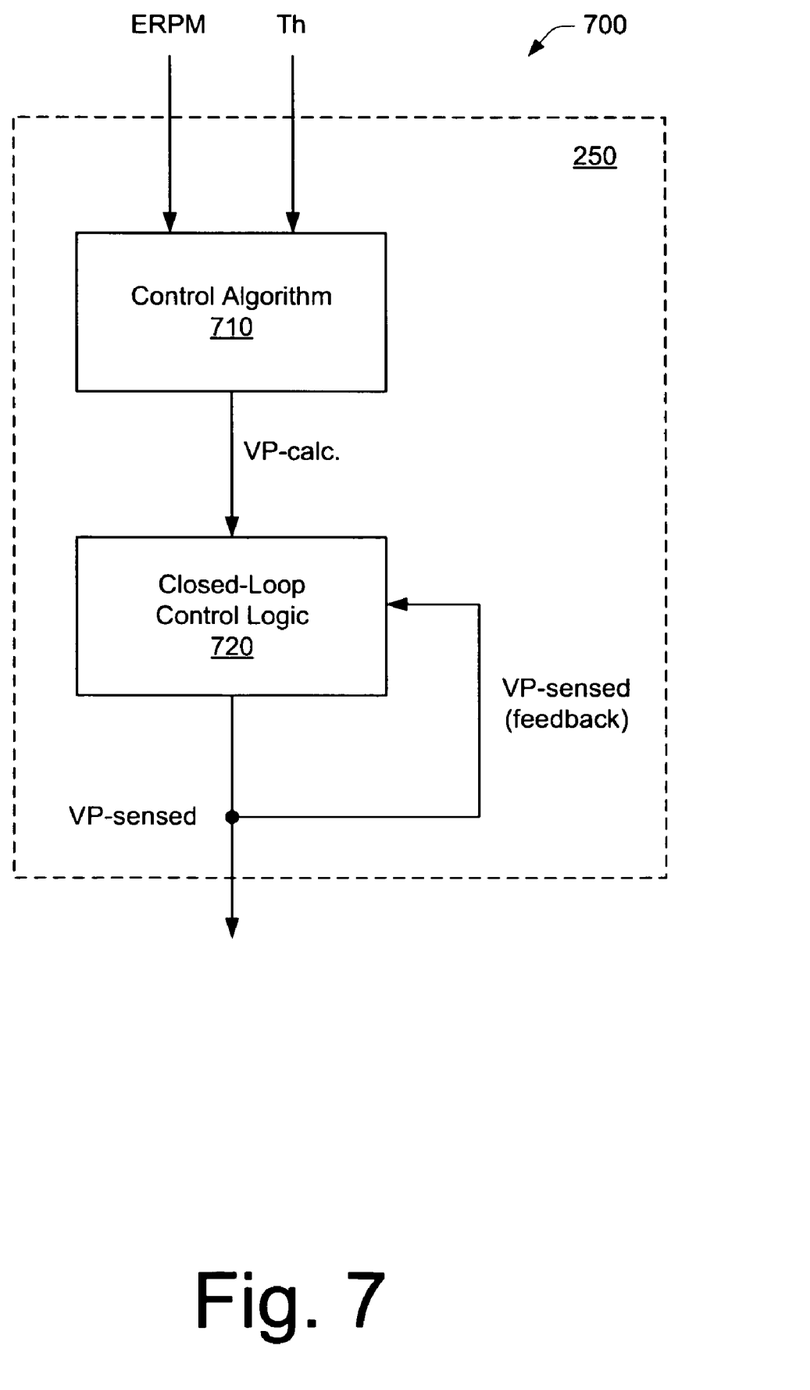
FIG. 7 is a diagram of a control scheme for controlling geometry of a variable geometry compressor.

As discussed herein various technologies can help a turbocharger change compressor diffuser geometry to adapt the compressor map to the engine running conditions. FIG. 7 shows a control scheme 700 that includes a control algorithm 710 and closed-loop control logic 720 suitable for use in controlling geometry of a variable geometry compressor with respect to changes in engine operating conditions. More specifically, in the example of FIG. 7, the control algorithm 710 receives engine RPM (ERPM) and throttle (Th) information and calculates or otherwise determines (e.g., look-up table, etc.) a vane position (VP-calc.). The closed-loop control logic then uses VP-calc. to set vane position. A sensor or other mechanism provides feedback as to the actual vane position (VP-sensed). In turn, the closed-loop control logic receives VP-sensed to minimize error between the VP-calc. and VP-sensed through further adjustment, as warranted, to a vane actuator, etc.

An exemplary controller for a variable geometry compressor can include one or more inputs for receiving engine operating information and for receiving a signal representative of geometry of a variable geometry compressor. For example, the controller 250 of FIG. 2 includes an input from the ECU 290 and it may also include an input to receive information from a sensor or include the sensor 256. A sensor may sense geometry (e.g., position of one or more components) directly or indirectly. Such a controller may also include control logic to call for actuation of an actuator based at least in part on the engine operating information received by the one or more inputs and to call for actuation of the actuator based at least in part on the signal received by the one or more inputs whereby actuation of actuator causes a change in geometry of a variable geometry compressor. For example, the controller 250 of FIG. 2 includes a processor 252 and memory 254, which may execute and store, respectively, instructions for control logic. In response, the controller 250 may use the actuator 258 to control the arm 238 and thereby control position of the vanes 210. The controller 250 (see, e.g., FIG. 7) may receive a signal representative of geometry of a variable geometry compressor where this signal provides for closed-loop control.

An exemplary method includes providing a variable geometry compressor (see, e.g., compressor 124 of FIG. 2) and an internal combustion engine (see, e.g., engine 110 of FIG. 1) wherein the variable geometry compressor comprises a plurality of vanes to vary geometry of a diffuser section of the compressor; operating the engine according to a series of operating conditions (e.g., ERPM, throttle, etc.); for each operating condition, determining a position for the vanes to optimize compressor efficiency; providing a model (e.g., linear or non-linear or optionally multiple models) for position of the vanes based on one or more engine operating parameters; performing a statistical analysis to fit the model (or models) using the determined positions of the vanes and the series of operating conditions; and programming a controller to control a variable geometry compressor using the fit model (or model selected from the multiple models).

Although exemplary methods, devices, systems, etc., have been described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A method comprising:
providing a variable geometry compressor and an internal combustion engine wherein the variable geometry compressor comprises a plurality of vanes to vary geometry of a diffuser section of the compressor;
operating the engine according to a series of operating condition;
for each operating condition, determining a position for the vanes to optimize compressor efficiency;
providing a non-linear model for position of the vanes based on one or more engine operating parameters wherein the non-linear model comprises one or more coefficients;
performing a statistical analysis to fit the non-linear model using the determined positions of the vanes and the series of operating conditions to thereby determine values for the one or more coefficients; and
programming a controller with control logic, the control logic stored in one or more computer-readable storage media, the controller thereby configured to control a variable geometry compressor based on the fit non-linear model and engine operating information wherein the engine operating information comprises engine throttle position and engine rotational speed.

2. A controller for a variable geometry compressor comprising:
one or more inputs for receiving engine operating information wherein the engine operating information comprises engine throttle position and engine rotational speed and for receiving a signal representative of geometry of a variable geometry compressor; and
control logic to call for actuation of an actuator based at least in part on the engine operating information received by the one or more inputs and to call for actuation of the actuator based at least in part on the signal received by the one or more inputs whereby actuation of actuator causes a change in geometry of a variable geometry compressor, wherein the control logic comprises a non-linear model that calculates vane position of a variable geometry compressor based on a received engine rotational speed and a received engine throttle position, wherein the non-linear model comprises coefficients and wherein a statistical analysis of data determines a value for each of the coefficients.

3. The controller of claim 2 wherein the signal representative of geometry of a variable geometry compressor provides for closed-loop control.

4. A controller for a variable geometry compressor comprising:
one or more inputs for receiving engine operating information wherein the engine operating information comprises engine throttle position and engine rotational speed;
an actuator;
a sensor for sensing, directly or indirectly, geometry of a variable geometry compressor; and
control logic, configured to operate according to a non-linear model based on a received engine throttle position and a received engine rotational speed, to actuate the actuator based at least in part on the engine operating information received by the one or more inputs and to actuate the actuator based at least in part on geometry sensed by the sensor whereby actuation of actuator causes a change in geometry of a variable geometry compressor wherein the non-linear model comprises coefficients and wherein a statistical analysis of data determines a value for each of the coefficients.

5. One or more computer-readable media comprising instructions executable by a processor to perform control logic for controlling a variable geometry compressor comprising, the control logic configured:
to call for actuation of an actuator based at least in part on engine operating information received by one or more inputs and
to call for actuation of the actuator based at least in part on a received signal representative of geometry of a variable geometry compressor whereby actuation of actuator causes a change in geometry of the variable geometry compressor,
wherein the control logic comprises a non-linear model that calculates vane position of a variable geometry compressor based on a received engine rotational speed and a received engine throttle position,
wherein the non-linear model comprises coefficients and
wherein a statistical analysis of data determines a value for each of the coefficients.

6. A compressor for an internal combustion engine comprising:
a variable geometry diffuser section;
one or more inputs for receiving engine operating information wherein the one or more inputs receive engine rotational speed and engine throttle position;
an actuator; and
control logic to control the actuator based at least in part on the engine operating information to thereby vary the geometry of the diffuser section wherein the control logic comprises a non-linear model for calculation of geometry of the diffuser section based at least in part on a received engine rotational speed and a received engine throttle position wherein the non-linear model comprises coefficients and wherein a statistical analysis of data determines a value for each of the coefficients.

7. The compressor of claim 6 wherein the variable geometry diffuser section comprises a plurality of vanes.

8. A turbocharger having a compressor, the compressor comprising:
a variable geometry diffuser section;
one or more inputs for receiving engine operating information wherein the one or more inputs receive engine rotational speed and engine throttle position;
an actuator; and
control logic to control the actuator based at least in part on the engine operating information to thereby vary the geometry of the diffuser section wherein the control logic comprises a non-linear model for calculation of geometry of the diffuser section based at least in part on a received engine rotational speed and a received engine throttle position wherein the non-linear model comprises coefficients and wherein a statistical analysis of data determines a value for each of the coefficients.

* * * * *